(12) United States Patent
Shrivastava et al.

(10) Patent No.: US 11,270,401 B2
(45) Date of Patent: Mar. 8, 2022

(54) GENERATING A CUSTOMIZED EGRESS BLUEPRINT

(71) Applicant: INTERNATIONAL BUSINESS MACHINES CORPORATION, Armonk, NY (US)

(72) Inventors: Anshul Shrivastava, Bhopal (IN); Hemant Kumar Sivaswamy, Pune (IN); Stuti Nair, Pune (IN); Sachin K. Mahajan, Pune (IN)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 16/574,230

(22) Filed: Sep. 18, 2019

(65) Prior Publication Data
US 2021/0082079 A1 Mar. 18, 2021

(51) Int. Cl.
*G08B 7/06* (2006.01)
*G06Q 90/00* (2006.01)
*H04W 4/024* (2018.01)

(52) U.S. Cl.
CPC ........... *G06Q 90/205* (2013.01); *G08B 7/066* (2013.01); *H04W 4/024* (2018.02)

(58) Field of Classification Search
CPC ..... G06Q 90/205; G08B 7/066; H04W 4/024; H04W 4/33; H04W 4/90
See application file for complete search history.

(56) References Cited

U.S. PATENT DOCUMENTS

| | | | | |
|---|---|---|---|---|
| 9,898,912 B1* | 2/2018 | Jordan, II | ............. | G08B 17/10 |
| 10,045,187 B1* | 8/2018 | Soleimani | ............... | H04W 4/90 |
| 10,997,832 B1* | 5/2021 | Vadayadiyil Raveendran | ............ | |
| | | | | G02B 27/017 |
| 2009/0138353 A1* | 5/2009 | Mendelson | ............... | G01S 5/02 |
| | | | | 705/14.39 |
| 2014/0159910 A1* | 6/2014 | Lee | ......................... | G08B 7/066 |
| | | | | 340/691.6 |
| 2016/0123741 A1 | 5/2016 | Mountain | | |
| 2016/0180663 A1* | 6/2016 | McMahan | ............. | G08B 7/062 |
| | | | | 340/691.6 |
| 2016/0349060 A1* | 12/2016 | Chien | ..................... | H04W 4/33 |

(Continued)

FOREIGN PATENT DOCUMENTS

KR 101565727 B1 11/2015
KR 20170088105 A 8/2017
(Continued)

OTHER PUBLICATIONS

Mell et al., "The NIST Definition of Cloud Computing", National Institute of Standards and Technology, Special Publication 800-145, Sep. 2011, pp. 1-7.

*Primary Examiner* — Munear T Akki
(74) *Attorney, Agent, or Firm* — Kristofer L. Haggerty

(57) ABSTRACT

The exemplary embodiments disclose a system and method, a computer program product, and a computer system for generating a customized blueprint dynamically based on contextual data. The exemplary embodiments may include collecting contextual data within an environment and extracting one or more factors from the collected contextual data. The exemplary embodiments may additionally include generating an optimized path of egress by applying a model to the one or more factors and displaying the optimized path of egress on a device of a user.

14 Claims, 5 Drawing Sheets

(56) References Cited

U.S. PATENT DOCUMENTS

| | | | | |
|---|---|---|---|---|
| 2018/0188034 A1* | 7/2018 | Duan | .................... | H04W 4/024 |
| 2018/0204428 A1 | 7/2018 | Asaro | | |
| 2018/0350207 A1* | 12/2018 | Yang | ...................... | A62C 27/00 |
| 2018/0356241 A1* | 12/2018 | Correnti | ................. | G08B 7/066 |
| 2021/0158670 A1* | 5/2021 | Derickson | ............ | G06Q 90/205 |
| 2021/0325188 A1* | 10/2021 | Nanda | .................. | G01C 21/206 |

FOREIGN PATENT DOCUMENTS

| | | | |
|---|---|---|---|
| KR | 101828239 B1 | 3/2018 | |
| KR | 101904031 B1 | 10/2018 | |

\* cited by examiner

GENERATING A CUSTOMIZED EGRESS BLUEPRINT

BACKGROUND

The exemplary embodiments relate generally to generating a path of egress, and more particularly to generating a path of egress dynamically based on contextual data.

When a person needs to navigate in a large premises such as a shopping mall, industrial warehouse, stadium, airport, etc., they may need to be aware of a blueprint or floorplan of the structural building in order to locate an exit during an emergency. While some locations may have a map/directory at certain locations or a support staff to help with giving directions, there is a lot of dependability in these methods. Depending on the person, including features such as age, disability, etc., the complexity of locating an exit may vary. For example, a person with a heart condition or an elderly person will not be able to move quickly while a person with a mental disability or blindness may face different difficulties, particularly in the case of an emergency.

SUMMARY

The exemplary embodiments disclose a system and method, a computer program product, and a computer system for generating a customized blueprint dynamically based on contextual data. The exemplary embodiments may include collecting contextual data within an environment and extracting one or more factors from the collected contextual data. The exemplary embodiments may additionally include generating an optimized path of egress by applying a model to the one or more factors and displaying the optimized path of egress on a device of a user.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
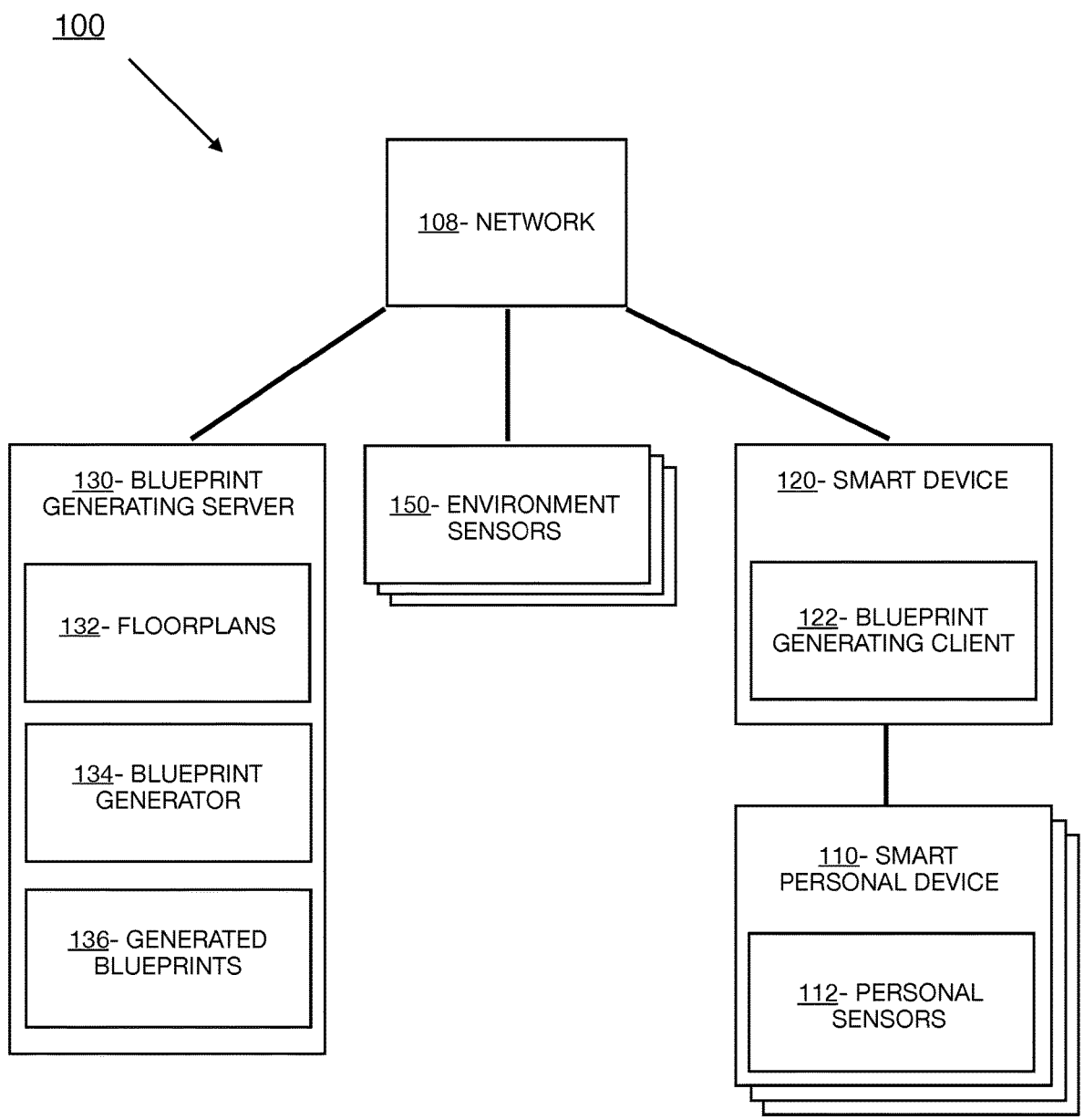
FIG. 1 depicts an exemplary schematic diagram of a customized blueprint generating system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

When a person needs to navigate in a large premises such as a shopping mall, industrial warehouse, stadium, airport, etc., they may need to be aware of a blueprint or floorplan of the structural building in order to locate an exit during an emergency. While some locations may have a map/directory at certain locations or a support staff to help with giving directions, there is a lot of dependability in these methods. Depending on the person, including features such as age, disability, etc., the complexity of locating an exit may vary. For example, a person with a heart condition or an elderly person will not be able to move quickly while a person with a mental disability or blindness may face different difficulties, particularly in the case of an emergency.

Hence, an independent system is needed to address the problem. Exemplary embodiments of the present invention disclose a method, computer program product, and system to modify blueprints/floorplans of environments using contextual data gathered by smart devices to construct customized egress blueprints, which may be particularly advantageous during emergencies and for those with disabilities. Accordingly, example embodiments are directed to a system that will facilitate navigation in the event of an emergency. In embodiments, cognitive-based computer vision may be used in conjunction with a map/floorplan and one or more sensors, such as IoT devices, in order to generate a customized and optimal egress route. The generated egress route may be optimized with respect to duration of time required to reach a safe zone, ease of travel required to reach a safe zone, or a combination of these considerations with any other considerations. This process may involve tracking video, audio, voice, vibration, sound, etc., contextual relationships within dynamic real time environments, coupled with environment blueprints/floorplans, in order to identify pathways of egress. In particular, example embodiments may be configured for identifying audio, visual, vibrational, and other factors for mapping an egress blueprint. A use case of embodiments described herein may relate to customized egress blueprint mapping within large or complex locations, such as shopping malls, stadiums, schools, airports, train stations, etc. (e.g., a shopping mall with more than one floor of shops, kiosks, and other structures) in order to assist one or more persons exiting a premises. In general, it will be appreciated that embodiments described herein may relate to aiding in the mapping of an optimized egress blueprint within any environment.

FIG. 1 depicts the customized blueprint generating system 100, in accordance with the exemplary embodiments. According to the exemplary embodiments, the customized blueprint generating system 100 may include a smart personal device 110, a smart device 120, one or more environment sensors 150, and a blueprint generating server 130, which may all be interconnected via a network 108. While programming and data of the exemplary embodiments may be stored and accessed remotely across one or more servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the customized blueprint generating system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the exemplary embodiments, the smart personal device 110 includes one or more personal sensors 112, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, a smart watch, a smart ring, a pair of smart glasses, an IoT device, or any other electronic device or computing system capable of receiving and sending data to and from other computing devices. While the smart personal device 110 is shown as a single device, in other embodiments, the smart personal device 110 may be comprised of a cluster or plurality of computing devices, in a modular manner, etc., working together or working independently. The smart personal device 110 is described in greater detail as a hardware implementation with reference to FIG. 3, as part of a cloud implementation with reference to FIG. 4, and/or as utilizing functional abstraction layers for processing with reference to FIG. 5.

In example embodiments, the one or more personal sensors 112 may be integrated with the smart personal device 110 and may be one or more cameras, microphones, light sensors, infrared sensors, movement detection sensors, pressure detection sensors, thermometers, heart rate sensors, accelerometers, gyroscopes, inertial devices, pacemakers, respiratory rate sensors, humidity sensors, or other sensory hardware equipment. Moreover, the smart personal device 110 may incorporate an array of one or more of the personal sensors 112 such that information can be obtained by the one or more personal sensors 112 in multiple directions, at different times/intervals, in different mediums/frequencies, and the like. Moreover, data processing techniques may be implemented such that directional information of visual, audio, and other data can be obtained based on signals received by the one or more personal sensors 112, such as trilateration and triangulation. While the one or more personal sensors 112 may be incorporated in the smart personal device 110, in other embodiments, the one or more personal sensors 112 may connect remotely to the smart device 120. For example, the one or more personal sensors 112 may be incorporated directly into the smart device 120, such as a camera and microphone incorporated into the cell phone of a user. In such embodiments, the one or more personal sensors 112 may connect to the smart device 120, e.g., smart phones and laptops, or the network 108 without the need for the smart personal device 110. The one or more personal sensors 112 are described in greater detail with respect to FIG. 2 and FIG. 3.

In example embodiments, the one or more environment sensors 150 may be one or more sensors within an environment implementing the customized blueprint generating system 100. Unlike the one or more personal sensors 112, which may be integrated with the smart personal device 110 or the smart device 120, the one or more environment sensors 150 may communicate directly with the network 108. In embodiments, the one or more environment sensors 150 may be incorporated into any environment, such as a stadium, mall, convention center, hotel, etc. In addition, the one or more environment sensors 150 may be any sensory data collection device, such as a camera, motion sensor, automated door opening sensor, noise detector, moisture detector, fire detector, smoke detector, etc. The environment sensors 150 are described in greater detail with respect to FIG. 2 and FIG. 3.

In the example embodiment, the smart device 120 includes a blueprint generating client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. In addition to the components depicted by FIG. 3, the smart device 120 may further include an accelerometer, gyroscope, compass, barometer, thermometer, and other sensory equipment. The smart device 120 is described in greater detail as a hardware implementation with reference to FIG. 3, as part of a cloud implementation with reference to FIG. 4, and/or as utilizing functional abstraction layers for processing with reference to FIG. 5.

The blueprint generating client 122 may be a software and/or hardware application capable of communicating with and providing a user interface for a user to interact with a server via the network 108. The blueprint generating client 122 may act as a client in a client-server relationship. Moreover, in the example embodiment, the blueprint generating client 122 may be capable of transferring data from the smart device 120, the smart personal device 110, and/or the one or more personal sensors 112 between other devices via the network 108. In embodiments, the blueprint generating client 122 utilizes various wired and wireless connection protocols for data transmission and exchange, including Bluetooth, 2.4 gHz and 5 gHz internet, near-field communication, Z-Wave, Zigbee, etc. The blueprint generating client 122 is described in greater detail with respect to FIG. 2.

In the exemplary embodiments, the blueprint generating server 130 includes one or more floorplans 132, a blueprint generator 134, and generated blueprints 136. The blueprint generating server 130 may act as a server in a client-server relationship with the blueprint generating client 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the blueprint generating server 130 is shown as a single device, in other embodiments, the blueprint generating server 130 may be comprised of a cluster or plurality of computing devices, working together or working independently. The blueprint generating server 130 is described in greater detail as a hardware implementation with reference to FIG. 3, as part of a cloud implementation with reference to FIG. 4, and/or as utilizing functional abstraction layers for processing with reference to FIG. 5.

The floorplans 132 may be one or more designs, plans, diagrams, drawings, or other representations depicting a layout of one or more floorplans of a complex, building, park, theatre, museum, stadium, etc. The floorplans 132 may depict floors, exits, fire escapes, staircases, elevators, escalators, shops, kiosks, parking lots, fire alarms, sprinkler systems, fire extinguishers, HVAC routes, maintenance closets, electrical circuits, fuse boxes, etc. The blueprint generator 134 may modify or extract data from the floorplans 132 when generating customized egress routes for individuals within corresponding buildings, locations, environments, etc., by incorporating contextual data such as obstacles and crowds gathered by devices within an environment, such as IoT devices. In the example embodiment, the floorplans 132 may be extracted from databases corresponding to building developers/builders, building managerial services, federal, state, and municipality databases, emergency service providers, city planners, etc. The floorplans 132 may be updated manually, automatically, or both. These updates may occur periodically at set intervals, when modifications are detected, via sensory input, user input, etc. The floorplans 132 are described in greater detail with respect to FIG. 2.

The generated blueprints 136 may be modified versions of the one or more floorplans 132 that further incorporate customized egress information collected by the one or more personal sensors 112 and the one or more environment sensors 150. The generated blueprints 136 may be a single or multidimensional design, plan, diagram, drawing, or other representation depicting a layout and features of one or more floorplans of a complex, building, park, theater, museum, stadium, etc. The generated blueprints 136 may depict features from the one or more floorplans 132, such as floors, exits, fire escapes, staircases, elevators, escalators, shops, kiosks, parking lots, fire alarms, sprinkler systems, fire extinguishers, HVAC routes, maintenance closets, electrical circuits, fuse boxes, etc., as well as contextual information gathered by the one or more personal sensors 112 and the one or more environment sensors 150, such as crowds, hazards, obstacles, etc.

The blueprint generator 134 may be a software and/or hardware program capable of receiving a configuration. The blueprint generator 134 may be further capable of detecting a user, and collecting and processing environmental and patron data. Additionally, the blueprint generator 134 may generate an egress blueprint, detect an emergency, and display said egress blueprint. The blueprint generator 134 is described in greater detail with reference to FIG. 2.

Figure 2:
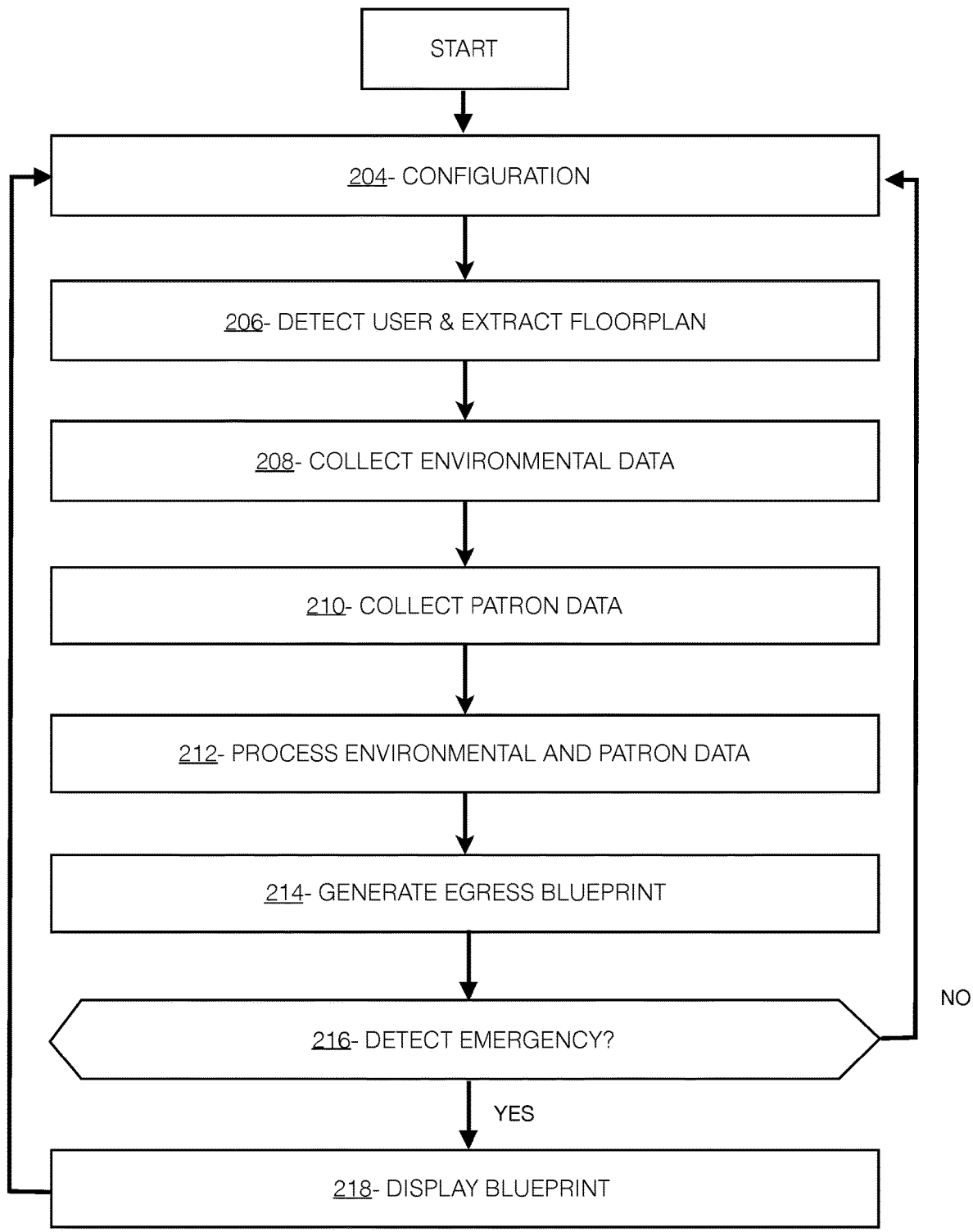
FIG. 2 depicts an exemplary flowchart illustrating the operations of a blueprint generator 134 of the customized blueprint generating system 100 in generating one or more generated blueprints 136, in accordance with the exemplary embodiments.

FIG. 2 depicts an exemplary flowchart illustrating the operations of the blueprint generator 134 of the customized blueprint generating system 100 in generating the one or more generated blueprints 136, in accordance with the exemplary embodiments.

The blueprint generator 134 may receive a configuration (step 204). The blueprint generator 134 may be configured by receiving a user registration, user health data, and user preferences. In the example embodiment, the configuration may be received by the blueprint generator 134 via the blueprint generating client 122 and the network 108. In embodiments, receiving the user registration may involve receiving demographic information such as a username, location, device type, the one or more personal sensor types, and the like.

When receiving the configuration, the blueprint generator 134 may further receive user health data, for example data about user mobility and any disabilities (step 204 continued). In embodiments, the user health data may be extracted from the smart personal device 110, the one or more personal sensors 112, the smart device 120, the one or more environment sensors 150, health databases, etc. For example, the blueprint generator 134 may receive information from a user, such as a positive indication of an ailment or an electronic health record, to determine that a user has a limp. In addition, the blueprint generator 134 may reference the smart device 120, such as a personal device smart watch, to determine from an integrated accelerometer that the user has a limp based on a rhythm of movement. Alternatively, the blueprint generator 134 may reference the one or more environment sensors 150, such as a security camera, to determine a user has a limp. In other embodiments, the blueprint generator 134 may extract user health data by searching social media platforms for data relating to a user's health and ability to exit a premise. For example, a user may indicate in their profile a particular health condition or that they belong to a group associated with a particular health condition. Alternatively, the blueprint generator 134 may analyze video and audio of the user on social media to determine whether the user has a wheelchair, limp, sling, oxygen tank, crutch, etc.

The blueprint generator 134 may further receive user preferences during configuration, which may include whether to receive voice commands, particular hazards/obstacles to avoid in an egress route, and the preferred manner in which a blueprint is to be displayed to the user (step 204 continued). Additional user preferences may include the types of routes to be displayed as well as how many or how to prioritize suggested egress routes displayed by the generated blueprints 136. Additionally, user preferences may include one or more preferred sizes and colors of visual emphasis, e.g., for those with color blindness or color sensitivities, as well as the preferred frequency and amplitude of audio instruction. These various settings including color, size, frequency, and amplitude, may be customized to vary for different objects displayed by the generated blueprints 136 and for different commands or instruction vocalized by the generated blueprints 136. In the event that the smart device 120 or the smart personal device 110 display provides a user interface, user preferences may also encompass any modifiable settings pertaining to the user interface. For example, the preferred information to be displayed on a user's smart device 120 such as emergency type, severity of emergency, time of emergency, distance to exit, expected time of exit, current time, current weather, a map having a current location and destination, etc. may be a customizable user preference.

To further illustrate the operations of the blueprint generator 134, reference is now made to an illustrative example where a user creates an account via user registration listing his name, age, gender, and location, as well as health data indicating that he is in a wheelchair due to having suffered a broken leg. In addition, the user registers his smart phone and smart watch, indicating as a preference that he would prefer a custom egress path to be displayed via his smart watch.

The blueprint generator 134 may detect a user within an environment (step 206). In the example embodiment, the blueprint generator 134 may detect a user within an environment configured for the customized blueprint generating system 100 via detection of the smart device 120 within the applicable environment. The blueprint generator 134 may detect the user by methods such as detecting when the smart device 120, and therefore the blueprint generating client 122, has connected to a network 108 of a compatible premises, or detecting when the GPS location of the smart device 120 matches that of a compatible premises. Alternatively, the blueprint generator 134 may implement facial recognition, fingerprint recognition, voice recognition, or other detection technology to sensory data of an environment in order to identify users entering and exiting the environment. Upon detecting the user within the environment, the blueprint generator 134 may then extract a floorplan corresponding to the location from the floorplans 132.

In the event that the blueprint generator 134 has previously generated a customized blueprint for a user who visited the premises in the past, the blueprint generator 134 may extract the user's previous blueprint from the generated blueprints 136 (step 206 continued). In situations where obtaining new information regarding the environment is not applicable, such as a loss of electrical or network connection, the blueprint generator 134 may extract a generated blueprint 136 corresponding to a different user having similar characteristics. For example, if a power outage were to occur, the blueprint generator 134 may utilize the generated blueprints 136 of a user with a limp for a new user having a similar limp. In the event that the premises are renovated or modified, the one or more floorplans 132 may be automatically or manually updated (via network 108 or locally) to reflect any modifications. Maintaining up to date information regarding the one or more floorplans 132 provide allows the blueprint generator 134 to generate the most accurate one or more generated blueprints 136 for users.

With reference again to the previously introduced example, the blueprint generator 134 detects that a user has entered a shopping mall by matching a GPS location of the cell phone of the user with a GPS location of the shopping mall. In addition, the blueprint generator 134 detects the user logging into the mall WiFi via the blueprint generating client 122.

The blueprint generator 134 may collect environmental data (step 208). Environmental data may be used to infer the locations of crowds, obstacles, hazards, etc. The blueprint generator 134 may collect environmental data, such as audio, video, pressure, temperature, etc. measurements, via the one or more environment sensors 150. This environmental data may include the audio and video footage of crowds or gatherings of people, as well as obstacles/hazards such as debris, fire, flooding, electricity, heat/cold, etc. For example, the blueprint generator 134 may utilize information gathered from video cameras mounted to the walls of a premises to determine whether there are obstructions to egress paths such as hallways, stairways, exits, etc. in their recording views. This data may be used later to determine the locations and severity of egress obstructions, whether they be crowds, debris, or elemental hazards. Additionally, the blueprint generator 134 may utilize microphones, for example those integrated with cameras, in the walls of a premises to determine how much noise is occurring in the microphones' vicinities. This data may be used later to determine a number of people positioned within each of the microphones' vicinities and analysis techniques such as trilateration, triangulation, the doppler effect analysis, etc., may be implemented to determine a location of the crowds, hazards, etc. relative to the one or more environment sensors 150. The blueprint generator 134 may also utilize information gathered from one or more pressure sensors in the floor of a premises to determine an amount of weight or vibration experienced by the sensors. This data may be used later to estimate the number of people standing on or traversing the one or more pressure sensors. Similarly, the blueprint generator 134 may later implement analysis techniques to determine a direction of movement of the weight sensed by the weight sensors, and ultimately deduce flow rates of crowds and/or obstacles. The blueprint generator 134 may additionally utilize any other environment sensors 150 throughout the premises such as a smart cafeteria ordering system that may quantify a number of food orders in the mall's food court to process later.

In addition to collecting environmental data from one or more environment sensors 150, in some embodiments, the blueprint generator 134 may collect environmental data using one or more personal sensors mounted to a user's smart personal device 110, such as a camera or microphone (step 208 continued). For example, the blueprint generator 134 may extract video from a cell phone camera of a group of people congregating in an area, a new wall that is unaccounted for in the most current version of the floorplans 132, or an obstacle or obstruction to an egress path. The blueprint generator 134 may similarly extract audio recorded by the cell phone of loud noises, which may later be interrupted as stomping feet and processed to estimate the number of people traversing that area. It will be appreciated by one skilled in the art that any environmental data collected by the one or more environment sensors 150 and/or the one or more personal sensors 112 may be processed later, along with collected patron data, to be utilized by the blueprint generator 134 to generate egress blueprints.

With reference again to the previously introduced example that included the wheelchair-bound user whose cell phone has connected to the internet in the shopping mall, the blueprint generator 134 collects audio and video footage from security cameras within the shopping mall as well as audio from the user's cell phone and smart watch.

The blueprint generator 134 may collect patron data (step 210). The blueprint generator 134 may utilize patron data to infer user data such as a user's position and a user's ailments/mobility ability. In embodiments, the blueprint generator 134 may reference GPS data, network connections, or other information of the smart device 120 and/or smart personal device 110 of a user to identify the location of a user within and relative to an environment. In other embodiments, the blueprint generator 134 may utilize the one or more personal sensors 112 to provide information regarding the user's position, such as camera feeds, purchases, social media activity, etc. The blueprint generator 134 may use an individual's GPS location, or a sensor such as a step counter or accelerometer in the smart device 120 or smart personal device 110 of the user to map the location of the user. In embodiments, the one or more personal sensors 112 may act as continuous monitors of a user's mobility ability. For example, the user may have input in their user registration, preferences, and health data that they do not have any mobility issues. However, if the user sprains their ankle while walking in a shopping mall, the one or more personal sensors 112 and/or the one or more environment sensors 150 may detect the user's limp and update the user's mobility ability. Video footage or other data may be processed to reveal a user's disability or mobility ability. For example, the blueprint generator 134 may identify a rate of movement of a user based on the rate of motion over time in video taken from a bystander's smartphone camera. The blueprint generator 134 may compare the user's heart rate or movement speed to the average heart rate or movement speed for an individual with the user's height, weight, age, etc. to estimate the user's mobility ability.

In addition to collecting patron data from one or more personal sensors 112, in some embodiments, the blueprint generator 134 may also use the one or more environment sensors 150 such as video cameras located in the environment to collect patron data (step 210 continued). For example, the blueprint generator 134 may utilize the one or more environment sensors 150 to identify a user, locate a user, and determine a mobility of a user. The blueprint generator 134 may identify a user, locate a user's position, and determine a user's mobility ability based on their pattern of movement, clothes, facial recognition, or other identification methods. For example, a video camera suspended in an environment may capture footage of a user limping. This footage may reveal the identity of the user, the user's location, and the mobility ability of the user. Patron data collected by the blueprint generator 134 via the one or more personal sensors 112 and one or more environment sensors 150 is processed along with environmental data to be utilized by the blueprint generator 134 to later generate the generated blueprints 136.

With reference again to the previously introduced example that included the wheelchair-bound user in the shopping mall, the blueprint generator 134 receives visual data from the user's smart phone camera regarding the user's position on the shopping mall's second floor relative to the stores and mall kiosks around him. Additionally, the blueprint generator 134 receives visual data from a mounted security camera of the user traveling in his wheelchair at a rate of one mile per hour.

The blueprint generator 134 may process environmental data and patron data individually, as well as in combination/bulk (step 212) to identify impediments to egress such as crowds of people and hazards/obstacles, as well as user ailments. When processing the data to identify crowds, the blueprint generator 134 may use video processing methods in order to map egress paths that account for said crowds. For example, the blueprint generator 134 may process video data to identify one or more individuals within the premises, for example based on faceprints, clothing, mannerisms, posture, etc., as well as a number of individuals traveling in a given area. In some embodiments, methods may be used to track the identified individuals, as well as a number of individuals, entering and exiting a particular video recorded area. This analysis may involve the tracking of one or more individuals from the recorded area of one camera to the recorded area of another, which assists in the identification of the number of people in given areas and their movement patterns. This video tracking may be used to determine a real-time or average rate of users utilizing an entrance/exit and when it may be optimal to route a user to an alternative exit. Video processing may also process how quickly people are moving and assess the exit rates of different exits by counting how many individuals successfully exit through an exit in a given amount of time. For example, if ten individuals are exiting through a particular exit every ten seconds while only six individuals are exiting through an alternative exit every ten seconds, the blueprint generator 134 may determine that the former exit is a more efficient exit with a higher rate of traffic flow than the latter, and prioritize the former exit when generating the generated blueprints 136.

The blueprint generator 134 may also use audio processing methods to determine crowds or gatherings of people, such as determining a noise level or a number of different voiceprints in the data to estimate a number of people within an area (step 212 continued). The blueprint generator 134 may utilize the estimated number of people within an area to determine whether an egress path or exit is impeded. For example, if a noise level, one or more consistent noises, or one or more voiceprints are detected in a same area for more than a threshold amount of time, the blueprint generator 134 may deduce that foot traffic is not moving in that area. Audio data may be processed to determine specific locations of sounds using a mapping of the microphones in an environment, timestamps of the signals, and methods such as triangulation or trilateration, with reference to any other acoustic characteristics of the environment identified at the configuration stage. The blueprint generator 134 may also compare a determined decibel level of the audio data to a reference decibel level indicative of an average number of individuals needed to produce sound of that amplitude, allowing the blueprint generator 134 to estimate a number of individuals present in an area. For example, the blueprint generator 134 may detect audio footage from a microphone with a greater amplitude than that produced by twenty people and determine that there are at least twenty people in its vicinity. The blueprint generator 134 may further process the audio to eliminate noise, such as the amplitude of sirens and any other background sounds not associated with individuals when calculating the collected amplitude. The blueprint generator 134 may further implement doppler effect calculations and analysis to determine directions of movement towards or away from a camera or microphone. The blueprint generator 134 may utilize this data along with the floorplans 132 in order to determine a person's position relative to the mapping of the camera or microphone.

In addition to identifying crowds of people, the blueprint generator 134 may process environmental data and patron data, such as video and audio data, individually, as well as in combination/bulk (step 212 continued) to identify obstacles or hazards, such as debris, a fire, or a collapse. The blueprint generator 134 may process video data using various computer vision methods to determine the type and severity of obstacle/hazard in a given area. For example, the blueprint generator 134 may determine from the brightness of a video feed that there is a fire, with either extreme brightness indicating flames or extreme darkness indicating smoke. The blueprint generator 134 may also compare current video footage to previous video footage in order to determine that debris or other obstacles have impeded a pathway. This analysis may also involve the tracking of one or more objects, obstacles, or hazards from the recorded area of one camera to the recorded area of another, which assists in the identification of the type and severity of an obstacle or hazard in a given area. For example, if there is a fire located in the way of an exit path, the blueprint generator 134 may determine that an alternate exit is more ideal and prioritize this exit when generating optimal blueprints.

The blueprint generator 134 may also use audio processing to determine the location of hazards or obstacles (step 212 continued). In embodiments, the blueprint generator 134 may detect obstacles/hazards by processing audio data for loud noises indicative of collapses, burning sounds indicative of fire, noises of flowing water indicative of floods, etc. Moreover, the blueprint generator 134 may locate the obstacle or hazard by reference to a mapping of the microphones in an environment, timestamps of the signals, etc., along with methods such as triangulation or trilateration.

In addition to identifying obstacles or hazards, the blueprint generator 134 may process environmental data and patron data, such as video and audio data, individually, as well as in combination/bulk (step 212 continued) to identify user ailments, such as a limp. In some embodiments, various computer vision methods may be used to track an individual entering or exiting a particular video recorded area. This analysis may involve the tracking of a user from the recorded area of one camera to the recorded area of another, which assists in the identification of the recorded user and the identification of the user's ailment. This video tracking may be used to determine the mobility ability of a user, such as a real-time or average rate of travel for a user. For example, the blueprint generator 134 may detect video footage of a user moving in a wheelchair or with a limp and determine that an egress path utilizing a ramp is preferable over an egress path utilizing stairs. The blueprint generator 134 may also use audio processing to identify user ailments, such as a limp, with doppler effect calculations, triangulation, and/or trilateration in order to identify user locations relative to exits and map egress paths to account for said user ailments. For example, the blueprint generator 134 may detect audio footage of a user dragging a foot while limping and determine that a shorter egress path without inclines is to be heavily prioritized over a longer egress path.

While processed audio and video data have been described in great detail above with reference to identifying crowds or gatherings of people, obstacles or hazards, and user ailments, the blueprint generator 134 may additionally process (step 212 continued) any other collected data in a similar manner to identify other features or impediments to egress. For example, the blueprint generator 134 may utilize temperature data in order to determine the locations of a fire, weight sensors to determine locations of a collapse, water sensor data to determine locations of flooding, etc. In processing environmental and patron data, the blueprint generator 134 may process the factors in combination by cross referencing the analyzed audio, video, pressure, etc., factors in order to better identify groups of people, hazards/obstacles, and user ailments. The blueprint generator 134 may treat a combination of more than one factor indicating a same conclusion as a stronger indication of that conclusion than one of the factors individually. Conversely, the blueprint generator 134 may treat the combination of more than one factor indicating conflicting conclusions as a weaker indication of either of those conclusions from one of the factors individually. For example, if an audio recording indicates that there are roughly ten people in a given area and a video recording indicates that there are roughly ten people in a given area, the blueprint generator 134 may treat the combination of factors stronger than it would treat a sole audio recording of ten people in a given area. Similarly, if an audio recording indicates that there are roughly ten people in a given area and a video recording indicates that there are roughly zero people in a given area, the blueprint generator 134 may treat the combination of factors weaker than it would treat a sole audio recording indicating ten people in a given area. In embodiments, the blueprint generator 134 may weight each of the factors, and such weights may be modified based on the above considerations. Cross referencing and grouping analyzed factors may occur for all types of collected factors, regardless of the sensor types that collected the factors.

With reference again to the previously introduced example that included the wheelchair bound user in the shopping mall, the blueprint generator 134 processes video and audio data from his smart phone, and video data from shopping mall video cameras to determine that fifteen people are convened near a double-door exit on the first floor of the mall and five people are convened near a single-door, second-floor terrace exit.

The blueprint generator 134 may generate one or more egress blueprints (step 214). In the example embodiment, the blueprint generator 134 may utilize the processed factors in order to identify an optimal and customized exit route for users. In embodiments, this may involve the blueprint generator 134 identifying a potential route as being, for example, a fastest, safest, or least physically challenging route for a given user, based on information gathered such as crowds, obstacles/hazards, user mobility, etc. In a basic example, if a route has a greatest number (combined or individually) of associated positive factors, such as minimal obstacles, minimum hazards, minimum crowdedness, and maximum ease or speed, the blueprint generator 134 identifies the potential route as the ideal route. In other embodiments, other egress considerations may be prioritized, such as safety, quickness, ease, or another positive characteristic. In example embodiments, the blueprint generator 134 may model such factors using machine learning methods such as neural networks, deep learning, hierarchical learning, Gaussian Mixture modelling, Hidden Markov modelling, and K-Means, K-Medoids, or Fuzzy C-Means learning, regularization, etc. Moreover, the blueprint generator 134 may utilize such models in order to generate the generated blueprints 136 by applying the models to the factors deduced from the data gathered by the one or more personal sensors 112 and the one or more environment sensors 150. Such models may assign weights to the factors or combination of factors as discussed earlier that may be modified and tweaked through use of a feedback loop indicative of whether the optimal route was identified and which factors were most relied upon in the determination, etc. The feedback loop is described in greater detail below.

With reference again to the previously introduced example that included the wheelchair-bound user in the shopping mall, the blueprint generator 134 utilizes the processed factors to generate a customized egress blueprint for the user routing the user to the second-floor terrace.

The blueprint generator 134 may determine whether an emergency has been detected (decision 216). The blueprint generator 134 may detect an emergency through various means, such as detecting a siren via the one or more environment sensors 150 and/or the one or more personal sensors 112, retrieving/receiving data from the network 108 indicating an emergency has occurred, notification from premises security/maintenance/etc., detecting the pulling of a fire alarm or activation of a fire sprinkler, user input, etc.

With reference again to the previously introduced example that included the wheelchair-bound user in the shopping mall, the blueprint generator 134 detects the ringing of a fire alarm in the building via the microphone of a security camera and determines that an emergency has been detected.

In step 218, the blueprint generator 134 may display the customized blueprint with the optimal route. In the example embodiment, the blueprint generator 134 may display the route on users' chosen display device (smart device 120 or smart personal device 110), such as their smart phones, smart tablets, augmented reality glasses, smart watches, etc., as well as any displays in the given environment. The display may incorporate the user's user interface settings and preferences, as discussed earlier. Additionally, the blueprint generator 134 may incorporate voice commands, aided by GPS locations, and emphasis techniques, including any method that is noticeable by the user such as audio or visual effects. Audio effects may be implemented via speakers on the smart device 120, smart personal devices 110, or speakers situated in the environment. Video effects may be implemented by displaying or projecting images, shapes, colors, or other various effects on or at one or more viewable surfaces. In embodiments, the blueprint generator 134 may implement virtual, augmented, or diminished reality. In such embodiments, the blueprint generator 134 may generate a virtual space for the user to traverse corresponding to the environment (virtual reality), overlay virtual objects onto a view of reality (augmented), or diminish the view of certain real world objects in order to see virtual or other real world objects better (diminished reality). Applied visual emphasis techniques include but are not limited to highlighting, zooming, subtitling, and translating. Applied audio emphasis includes amplification, enhancement, and translation, or audio replay to associated audio devices such as speakers, earbuds, headphones, etc.

The microphones, video cameras, and pressure sensors, along with one or more other personal sensors 112 and one or more environment sensors 150 may indicate to the blueprint generator 134 that individuals have successfully reached the safe zone (step 218 continued). For example, cameras or the GPS location of the user may indicate that the user has reached the safe zone. Additionally, users may be prompted on the smart device 120 or the smart personal device 110 to confirm whether they have successfully reached the safe zone. Upon confirmation that a user has successfully reached the safe zone, the blueprint generator 134 may stop displaying the optimized egress route. The blueprint generator 134 may utilize a feedback loop to update the models utilized by the blueprint generator 134 based on, for example, whether a user reached a safe zone in the expected time, whether the user reached the safe zone with the expected amount of effort/ease, if the user encountered more crowds/obstacles/hazards than expected, etc. The blueprint generator 134 may then use the feedback to tweak models used in generating the one or more generated blueprints 136. For example, if a user reached a safe zone in a shorter duration than anticipated, the blueprint generator 134 may increase the weight of factors relied upon in generating that user's egress blueprint. If a user reached a safe zone in a longer duration than anticipated, the blueprint generator 134 may decrease the weight of features relied upon in generating that user's egress blueprint. These updates would affect subsequent iterations of the system.

With reference again to the previously introduced example that included the wheelchair-bound user in the shopping mall, the blueprint generator 134 displays the user's customized blueprint with optimal route on his smart watch, according to his user preferences inputted in step 204. Additionally, audio instructions are emitted from the smartphone's speakers instructing the user to take a path to the ramp at the corner of the building which avoids the people running towards the stairs, and then turn left to exit towards the safety zone. The path, ramp, and exit door are highlighted in red according to the user's user preferences. Upon the user's arrival at the safety zone, the blueprint generator 134 detects that the user arrived earlier than anticipated, and therefore updates its models to increase the weight of influence of detecting a crowd of people by a first-floor exit in determining that an alternate exit should be used.

Having displayed the customized blueprints, the blueprint generator 134 returns to receiving a configuration. In embodiments where a user has already configured the blueprint generating system 100, the blueprint generator 134 may omit this step. If the user has not reached the safety zone successfully, the blueprint generator 134 may repeat the exemplary flowchart depicted in FIG. 2, continuously updating the user with their optimized blueprint until they reach the safety zone. The blueprint generator 134 may continue running and displaying optimal blueprints until the emergency detection decision 216 results in a NO decision.

Figure 3:
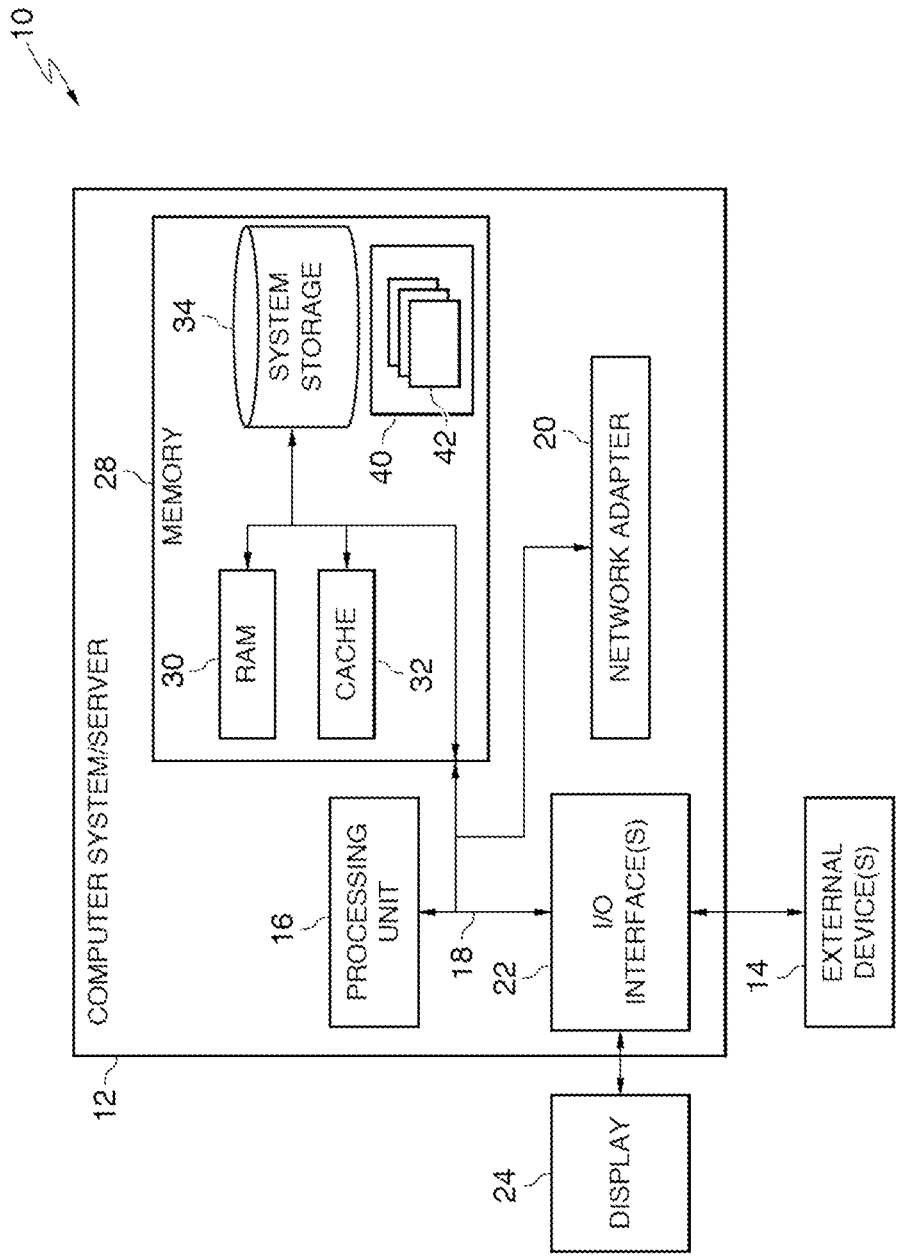
FIG. 3 depicts an exemplary block diagram depicting the hardware components of the customized blueprint generating system 100 of FIG. 1, in accordance with the exemplary embodiments.

FIG. 3 depicts a block diagram of devices within the customized blueprint generating system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
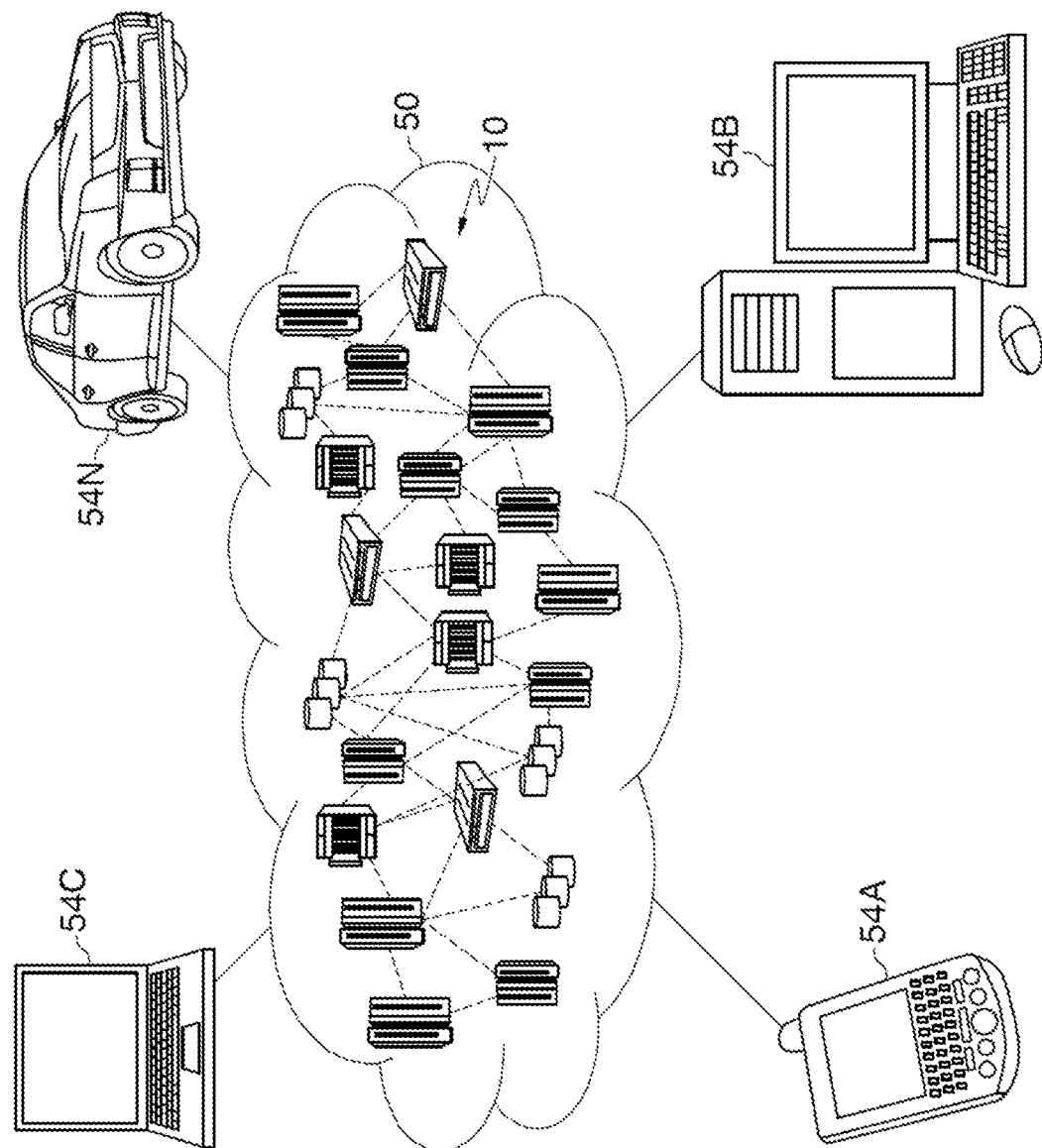
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
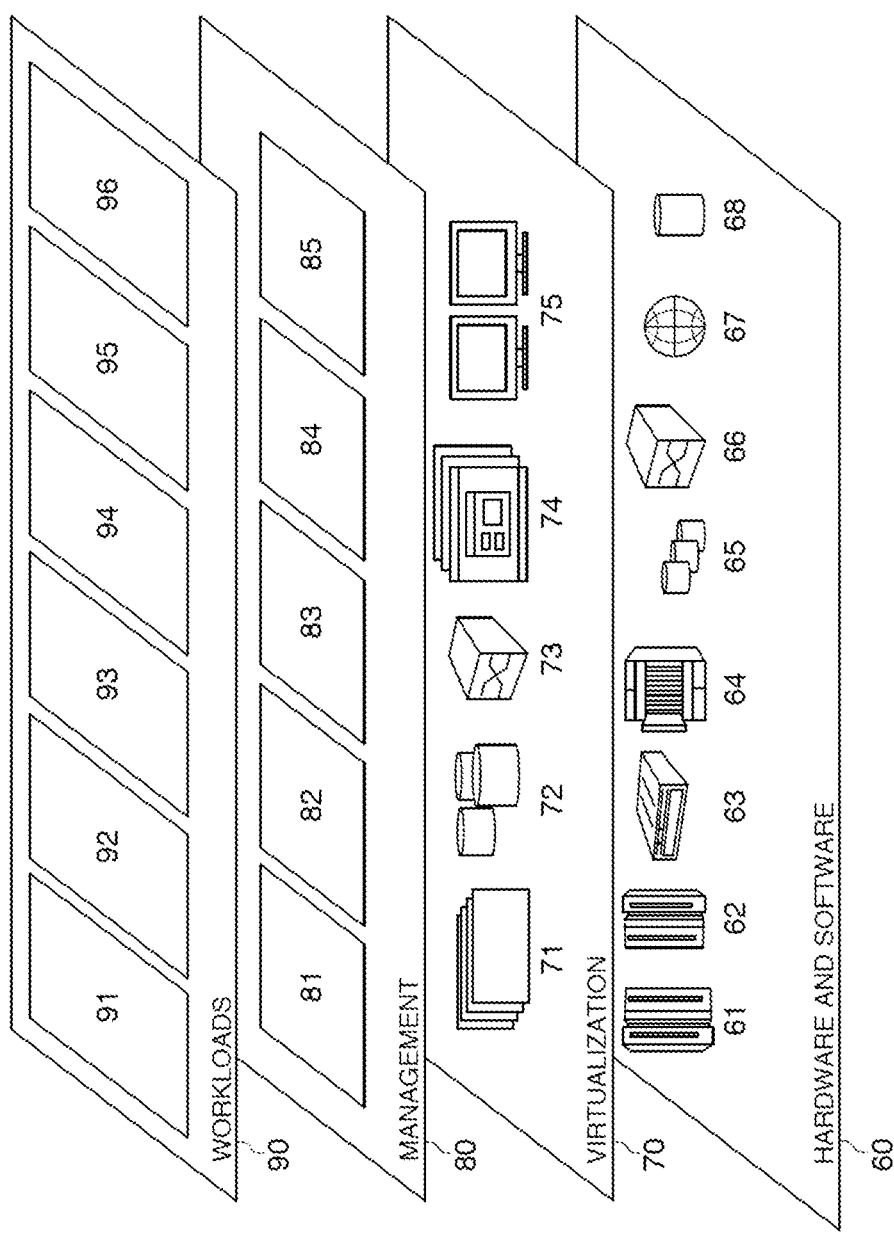
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and customized egress blueprint generation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating a customized egress blueprint, the method comprising:
   receiving, by a server, mobility data and one or more preferences corresponding to a user;
   collecting, by one or more sensors contextual data of a building;
   extracting, by the server, one or more factors from the received user mobility data and the collected contextual data;
   generating, by the server, an optimized path of egress by applying a model to the one or more factors, wherein the model correlates the one or more factors with the optimized path of egress out of the building;
   based on detecting an emergency and the one or more preferences, displaying, by a device of the user, the optimized path of egress;
   receiving, by the server, feedback indicative of whether the user has egressed the building; and
   adjusting, by the server, the model based on the received feedback.

2. The method of claim 1, wherein the contextual data includes data selected from a group comprising video data, audio data, weight data, vibrational data, gyroscopic data, accelerometer data, temperature data, and moisture data.

3. The method of claim 1, wherein one or more factors include factors selected from a group comprising a mobility of the user, crowds, debris, obstacles, fires, and flooding.

4. The method of claim 1, wherein the optimized path of egress is displayed with emphasis, and wherein the emphasis is selected from a group comprising of boxing, highlighting, magnifying, zooming, coloring, enhancing, amplifying, and transcribing.

5. The method of claim 1, wherein the model weights the one or more factors.

6. A computer program product for generating a customized egress blueprint, the computer program product comprising:
   one or more non-transitory computer-readable storage media and program instructions stored on the one or more non-transitory computer-readable storage media for performing a method, the method comprising:
   receiving, by a server, mobility data and one or more preferences corresponding to a user;
   collecting, by one or more sensors contextual data of a building;
   extracting, by the server, one or more factors from the received user mobility data and the collected contextual data;
   generating, by the server, an optimized path of egress by applying a model to the one or more factors, wherein the model correlates the one or more factors with the optimized path of egress out of the building;
   based on detecting an emergency and the one or more preferences, displaying, by a device of the user, the optimized path of egress;

receiving, by the server, feedback indicative of whether the user has egressed the building; and adjusting, by the server, the model based on the received feedback.

7. The computer program product of claim 6, wherein the contextual data includes data selected from a group comprising video data, audio data, weight data, vibrational data, gyroscopic data, accelerometer data, temperature data, and moisture data.

8. The computer program product of claim 6, wherein one or more factors include factors selected from a group comprising a mobility of the user, crowds, debris, obstacles, fires, and flooding.

9. The computer program product of claim 6, wherein the optimized path of egress is displayed with emphasis, and wherein the emphasis is selected from a group comprising of boxing, highlighting, magnifying, zooming, coloring, enhancing, amplifying, and transcribing.

10. The computer program product of claim 6, wherein the model weights the one or more factors.

11. A computer system for generating a customized egress blueprint, the computer system comprising:

one or more computer processors, one or more non-transitory computer-readable storage media, and program instructions stored on the one or more of the non-transitory computer-readable storage media for execution by at least one of the one or more processors for performing a method, the method comprising:

receiving, by a server, mobility data and one or more preferences corresponding to a user;

collecting, by one or more sensors contextual data of a building;

extracting, by the server, one or more factors from the received user mobility data and the collected contextual data;

generating, by the server, an optimized path of egress by applying a model to the one or more factors, wherein the model correlates the one or more factors with the optimized path of egress out of the building;

based on detecting an emergency and the one or more preferences, displaying, by a device of the user, the optimized path of egress;

receiving, by the server, feedback indicative of whether the user has egressed the building; and adjusting, by the server, the model based on the received feedback.

12. The computer system of claim 11, wherein the contextual data includes data selected from a group comprising video data, audio data, weight data, vibrational data, gyroscopic data, accelerometer data, temperature data, and moisture data.

13. The computer system of claim 11, wherein one or more factors include factors selected from a group comprising a mobility of the user, crowds, debris, obstacles, fires, and flooding.

14. The computer system of claim 11, wherein the optimized path of egress is displayed with emphasis, and wherein the emphasis is selected from a group comprising of boxing, highlighting, magnifying, zooming, coloring, enhancing, amplifying, and transcribing.

* * * * *